(12) United States Patent
Kubo

(10) Patent No.: US 8,472,166 B2
(45) Date of Patent: Jun. 25, 2013

(54) DISPLAY DEVICE WITH A DISPLAY PANEL SPACED APART FROM A FRAME

(75) Inventor: Jihei Kubo, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 260 days.

(21) Appl. No.: 12/856,915

(22) Filed: Aug. 16, 2010

(65) Prior Publication Data

US 2011/0134057 A1 Jun. 9, 2011

(30) Foreign Application Priority Data

Dec. 4, 2009 (JP) ................................. 2009-276589

(51) Int. Cl.
| | |
|---|---|
| *G06F 3/041* | (2006.01) |
| *G06F 1/16* | (2006.01) |
| *G02F 1/1333* | (2006.01) |
| *H05K 7/00* | (2006.01) |
| *H05K 5/00* | (2006.01) |
| *H04N 3/14* | (2006.01) |
| *H04N 5/64* | (2006.01) |

(52) U.S. Cl.
USPC ............. 361/600; 348/790; 348/794; 349/58; 361/679.09; 345/173

(58) Field of Classification Search
USPC .. 345/173, 174, 204–215, 690–699; 348/789, 348/794, 790; 349/56, 57, 58, 60, 69, 70; 361/600, 679.01, 679.21, 679.22, 679.26, 361/679.29, 679.55, 679.56, 679.09
See application file for complete search history.

(56) References Cited

U.S. PATENT DOCUMENTS

| | | | | |
|---|---|---|---|---|
| 5,581,443 A | * | 12/1996 | Nakamura et al. ............. | 361/705 |
| 6,667,782 B1 | * | 12/2003 | Taira et al. ....................... | 349/65 |
| 7,878,670 B2 | * | 2/2011 | Shibasaki et al. ................ | 362/84 |
| 2008/0297998 A1 | * | 12/2008 | Choi .............................. | 361/681 |
| 2011/0050598 A1 | * | 3/2011 | Park et al. ...................... | 345/173 |

FOREIGN PATENT DOCUMENTS

| | | |
|---|---|---|
| JP | 9-73072 | 3/1997 |
| JP | 2009-93066 | 4/2009 |

OTHER PUBLICATIONS

Office Action issued Oct. 25, 2011 in Japanese Patent Application No. 2009-276589 (English Translation only).

* cited by examiner

*Primary Examiner* — Dwayne Bost
*Assistant Examiner* — Larry Sternbane
(74) *Attorney, Agent, or Firm* — Oblon, Spivak, McClelland, Maier & Neustadt, L.L.P.

(57) ABSTRACT

A display panel includes a first end portion and a second end portion facing each other. A face panel is arranged above the front side of the display panel including a first extending portion and a second extending portion extending to the outside from the first and second end portions of the display panel. An adhesive element is provided on the display panel along its end portions to adhere the display panel to the face panel. A frame is arranged so as to being spaced apart from the display panel having a first supporting portion and a second supporting portion to support the first and second extending portions of the face panel. The first and the second extending portions of the face panel are sandwiched between the bezel and the first and second supporting portions of the frame so that the display panel does not contact with the frame.

6 Claims, 4 Drawing Sheets

DISPLAY DEVICE WITH A DISPLAY PANEL SPACED APART FROM A FRAME

CROSS-REFERENCE TO RELATED APPLICATION

This application is based upon and claims the benefit of priority from prior Japanese Patent Application No. 2009-276589, filed Dec. 4, 2009, the entire contents of which are incorporated herein by reference.

FIELD

The present invention relates to a display device and more particularly a liquid crystal display device.

BACKGROUND

A flat display panel represented by a liquid crystal display device and an organic electroluminescence display etc. is used for various display devices, such OA equipment as a personal computer, a television, a mobile equipment, for example, a cellular phone, a car navigation equipment, and an amusement equipment, taking advantage of the features such as a light weight, a thin shape, and low power consumption.

For example, Japanese Patent Application Laid Open No. 2009-93066 discloses a liquid crystal display device to display three-dimensional image, which includes a liquid crystal display panel with a display surface for displaying a picture, a lighting element to form the three-dimensional image by transmitting the displayed picture on the surface of the liquid crystal display panel, and a seal element to join the liquid-crystal display panel and the lighting element.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
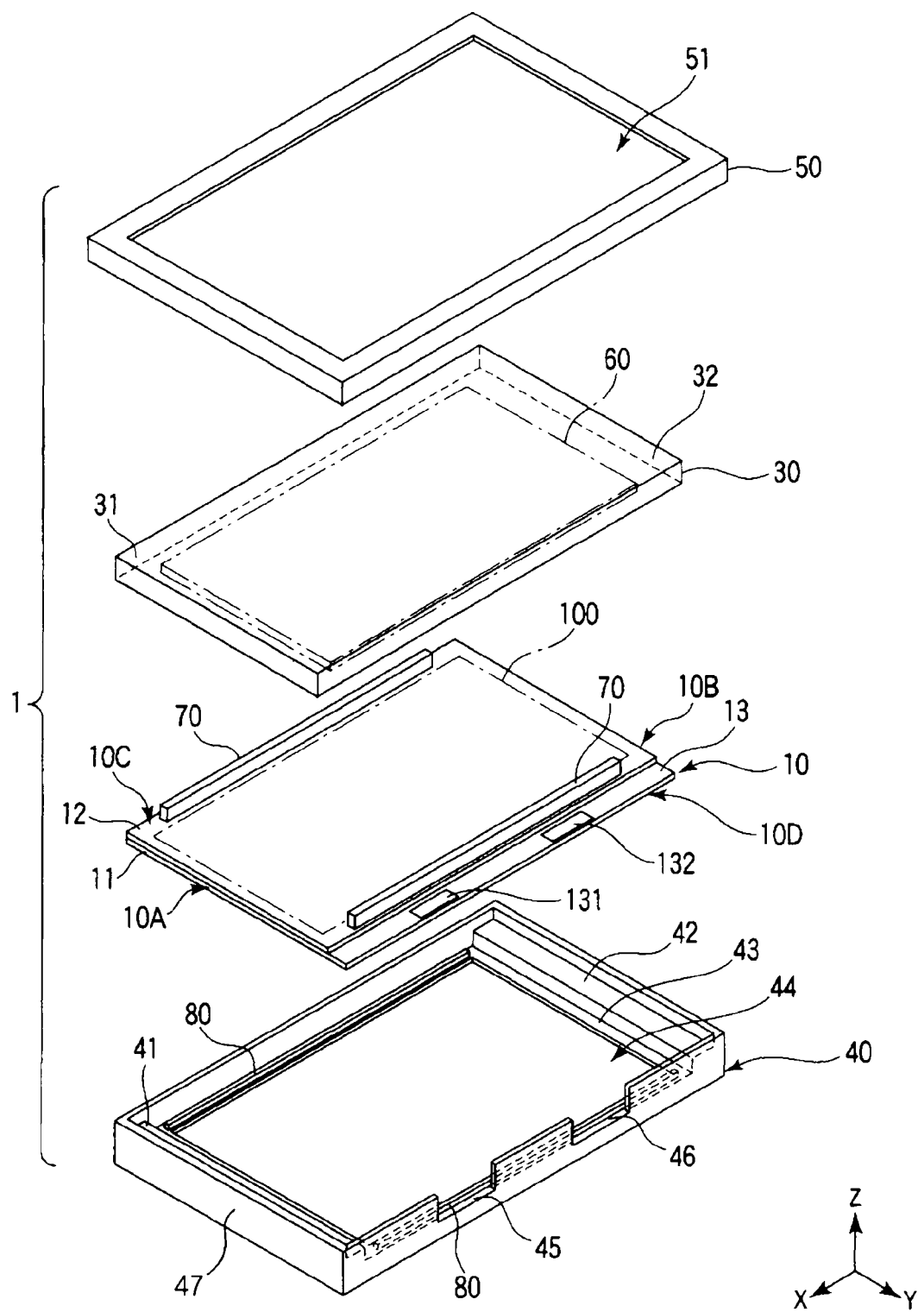
FIG. 1 is an exploded perspective view schematically showing a principal portion of a display device according to an embodiment of the present invention.

A display device and a liquid display device according to an exemplary embodiment of the present invention will now be described with reference to the accompanying drawings wherein the same or like reference numerals designate the same or corresponding parts throughout the several views.

According to one embodiment of the present invention, a display device includes a display panel in a plate-like shape having a first end portion and a second end portion facing each other; a face panel arranged above the front side of the display panel including a first extending portion and a second extending portion extending to the outside from the first end portion and the second end portion of the display panel, respectively; an adhesive element to adhere the display panel to the face panel; a frame spaced apart from the display panel having a first supporting portion and a second supporting portion to support the first extending portion and the second extending portion of the face panel, respectively; and a bezel fixed to the face panel and the frame so that the first and second extending portions of the face panel are sandwiched between the bezel and the frame, respectively.

According to another embodiment of the present invention, a liquid crystal display device includes a display panel in a plate-like shape having a first end portion and a second end portion facing each other, the display panel including a first substrate, a second substrate and a liquid crystal layer sandwiched therebetween to form an active area; a face panel arranged above the second substrate of the display panel including a first extending portion and a second extending portion extending to the outside from the first end portion and the second end portion of the display panel, respectively; an adhesive element to adhere the display panel to the face panel; a frame arranged to accommodate the face panel and the display panel, having a frame bottom portion formed at the bottom side, a side frame portion formed so as to surround the face panel and the display panel, a first supporting portion and a second supporting portion arranged to support the first extending portion and the second extending portion of the face panel, respectively, and the display panel being spaced apart from the bottom portion; a bezel fixed to the face panel and the frame so that the first and second extending portions of the face panel are sandwiched between the first and second supporting portions and the bezel, respectively; and a back light arranged at the bottom side of the frame to illuminate the active area of the display panel.

Hereafter, one embodiment of the present invention is explained in detail, referring to drawings. FIG. 1 is an exploded perspective view schematically showing a principal portion of the display device according to one embodiment.

The display device 1 includes an approximately rectangular plate-like display panel 10, a face panel 30 in a shape of an approximately rectangular plate arranged in the front of the display panel 10, a frame 40 to support the face panel 30, and a bezel 50 arranged so that the face panel 30 is supported between the bezel 50 and the frame 40. Hereafter, respective structures of above elements will be explained in detail.

The display panel 10 is constituted by attaching an approximately rectangular plate-like first substrate 11 and a second substrate 12 together. The display panel 10 includes an active area 100 of a approximately rectangular shape which displays the picture. In the display panel 10, the second substrate 12 side serves as a display surface which displays the picture.

The display panel 10 is formed in an approximately rectangular shape whose length in the first direction X is longer than that in the second direction Y. That is, the display panel 10 has a first end 10A and a second end 10B which face mutually, and a third end 10C and a fourth end 10D which connect the first end 10A and second end 10B, respectively. The first end 10A and the second end 10B extend in substantially parallel along the second direction Y, and form narrow sides. The third end 10C and the fourth end 10D extend in parallel along the first direction X, and form wide sides.

The first substrate 11 includes a mounting portion 13 extending to the outside in the second direction Y than the second substrate 12. The mounting portion 13 is formed along the fourth end 10D. Terminal portions 131 and 132 in which signal sources, such as a drive IC chip and a flexible wiring board are mounted, are formed in the mounting portion 13.

The face panel 30 is arranged between the display panel 10 and the bezel 50. Since the face panel 30 is located above the display surface of the display panel 10, the face panel 30 is constituted by an insulating transmissive substrate, for example, a glass substrate. The thickness of the face panel 30 in the third direction Z is approximately uniform. Moreover, the face panel 30 is formed in a approximately rectangular shape whose length in the first direction X is longer than that in the second direction Y.

The length in the first direction X of the face panel 30 is longer than that in the first direction X of the display panel 10. Namely, the face panel 30 includes a first extending portion 31 extending to outside in the first direction X from the first end 10A of the display panel 10, and a second extending portion 32 extending to the outside in the first direction X from the second end 10B of the display panel 10.

For example, a lens array layer 60 is arranged as a light element in the inside of the face panel 30, i.e., the surface opposing to the display panel 10. The lens array layer 60 is the light element, for example, for enabling a three-dimensional (3D) display. The lens array layer 60 may be formed by being directly molded on the face panel 30, or may be also adhered on the face panel 30 after molded as a different part. Anyway, the lens array layer 60 is held on the surface of the face panel 30.

The display panel 10 and the face panel 30 are attached together by adhesives 70. The adhesives 70 are located outside the active area 100 of the display panel 10, and arranged in a shape of a straight line along the first direction X. In this embodiment, the adhesives 70 are located between the upper surface of the second substrate 12 and the face panel 30 along the third end 10C and the fourth end 10D of the display panel 10.

Although the adhesives 70 are not explained in detail, the adhesives 70 also function as a spacer between the display panel 10 and the face panel 30 so as to form a uniform gap. The gap formed by the adhesives 70 is set, for example, to a value required to realize 3D display, and the lens array layer 60 held at the face panel 30 is spaced apart from the display panel 10 in this embodiment. However, the lens array layer 60 held at the face panel 30 and the display panel 10 do not necessarily need to be spaced apart from each other, and other structure can be also adopted in which the gap is not formed therebetween.

Here, the frame 40 is formed so that the face panel 30 supporting the lens array layer 60 can be accommodated while the face panel 30 and the display panel 10 are attached together. The frame 40 is formed, for example, by molded resin material.

The frame 40 includes a first supporting portion 41 to support the first extending portion 31 and a second supporting portion 42 to support the second extending portion 32 of the face panel 30, respectively. The first supporting portion 41 and the second supporting portion 42 extend along the second direction Y, and each surface of the first and second supporting portions 41 and 42 which support the face panel 30 is formed to be flat. Moreover, the interval between the first supporting portion 41 and second supporting portion 42 in the first direction X is equal or larger than the length of the display panel 10 in the first direction X.

In a state where the first extending portion 31 and the second extending portion 32 of the face panel 30 are supported by the first supporting portion 41 and the second supporting portion 42 of the frame 40, the display panel 10 held by the face panel 30 is located between the first supporting portion 41 and the second supporting portion 42, without contacting with the first supporting portion 41 and the second supporting portion 42.

Moreover, the frame 40 includes a bottom portion 43 which forms a step with the first supporting portion 41 and the second supporting portion 42. In this embodiment, the bottom portion 43 is formed in a shape of a frame. An opening 44 is formed in the central portion of the bottom portion 43. The level difference of the step in the third direction Z between the respective first supporting portion 41 and the second supporting portion 42 and the bottom portion 43 is larger than the thickness of the display panel 10 in the third direction Z. A back light container portion is formed under the bottom portion 43 to accommodate a back light to illuminate the active area 100 of the display panel 10.

In the state where the face panel 30 is supported by the frame 40, the first end 10A, the second end 10B, the third end 10C and the fourth end 10D of the display panel 10 held by the face panel 30 face the bottom portion 43, but are spaced apart from the bottom portion 43. Thus, the display panel 10 does not contact with the frame 40.

An elastic element 80 is arranged in the bottom portion 43 in which the bottom portion 43 faces the third end 10C and the fourth end 10D of the display panel 10, respectively. The elastic element 80 is arranged in a shape of a straight line along the first direction X. The elastic element 80 is, for example, formed of material which has rubber-like elasticity. In the state where the face panel 30 is supported by the frame 40 in this embodiment, the third end 10C and the fourth end 10D of the display panel 10 are spaced apart from the elastic element 80.

Furthermore, notched portions 45 and 46 for pulling out a flexible wiring board (not shown) to outside the frame 40 are formed in one of four frame side portions 47 of the frame 40, for example, the frame side portion 47 corresponding to the end 10D of the display panel 10. The flexible wiring board is connected with the terminal portions 131 and 132 of the display panel 10.

The bezel 50 is formed in a frame-like rectangular shape. An approximately rectangular opening 51 is formed in the bezel 50 right above the active area 100 of the display panel 10. The bezel 50 is fixed to the frame 40 so that the face panel 30 is sandwiched between the bezel 50 and the first and second supporting portions 41 and 42 of the frame 40.

Figure 2:
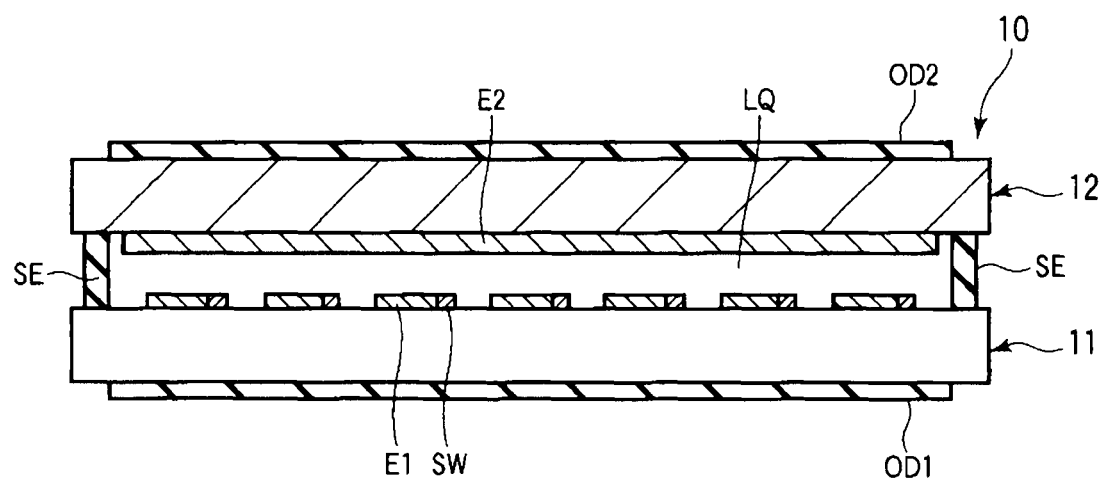
FIG. 2 is a cross-sectional view showing a structure of the display panel in the display device shown in FIG. 1.

Next, a structure of a transmissive type liquid crystal display device 10 is explained as an example of the display panel 10. FIG. 2 is a cross-sectional view schematically showing the structure of the liquid crystal display device 10.

That is, the liquid crystal display device 10 includes the first substrate 11, the second substrate 12 and the liquid crystal layer LQ held between the first substrate 11 and the second substrate 12. The first substrate 11 and the second substrate 12 are formed using insulating substrates, such as a glass substrate and a plastic substrate. The first substrate 11 and the second substrate 12 are attached together by a seal element SE. In the active area 100 to display the picture, the first substrate 11 includes a plurality of switching elements SW and first electrodes E1 connected to the switching elements SW, respectively in the surface which opposes to the second substrate 12. The second substrate 12 includes a second electrode E2 so as to face the first substrate 11. The second substrate 12 opposes to the plurality of first electrodes E1 through the liquid crystal layer LQ. The first electrodes E1 and the second electrode E2 are formed using electric conductive and transmissive material, such as Indium Tin oxide (ITO) and Indium Zinc Oxide (IZO).

Alignment films (not shown) are respectively arranged between the first electrodes E1 and the liquid crystal layer LQ, and between the second electrode E2 and the liquid crystal layer LQ. Moreover, spacers (not illustrated) are arranged between the first substrate 11 and the second substrate 12 to form the liquid crystal layer LQ having uniform thickness. The color type liquid crystal display device 10 is equipped with a color filter layer (not shown) arranged on the first substrate 11 or the second substrate 12, and includes some kinds of pixels, for example, a red pixel for displaying red (R) color, a green pixel for displaying green (G) color, and a blue pixel for displaying blue (B) color.

A first optical element OD1 is arranged on an external surface of the first substrate 11. Moreover, a second optical element OD2 is arranged on an external surface of the second substrate 12. The first optical element OD1 and the second optical element OD2 may contain a retardation film of one or more sheets if needed while containing a polarizing plate.

In the liquid crystal display panel 10, the second electrode E2 may be formed on the same substrate as the first electrode E1, not limited to the arrangement shown in FIG. 2. With respect to the liquid crystal mode, there is no restriction in particular. Some modes which mainly use vertical electrical field, such as TN (Twisted Nematic) mode, OCB (Optically Compensated Bend) mode and VA (Vertical Aligned) mode may be used. Furthermore, other modes which mainly use horizontal electrical field, such as IPS (In-Plane Switching) mode and FFS (Fringe Field Switching) mode are also applicable.

Figure 3:
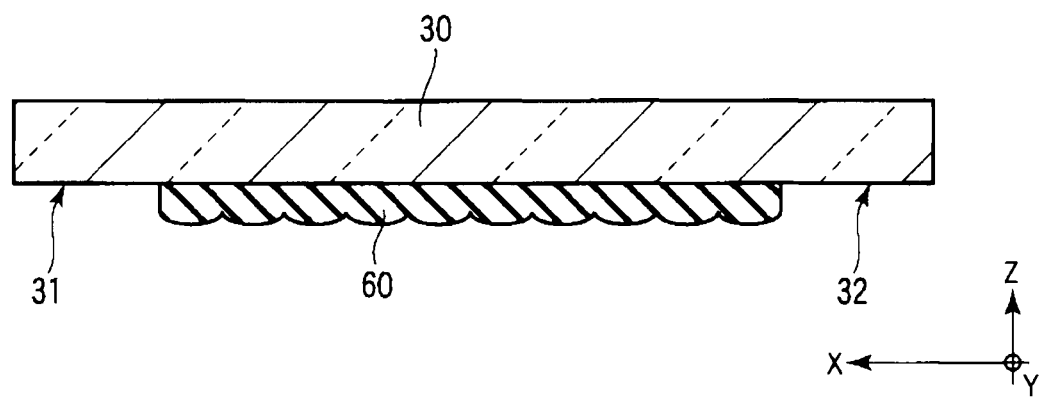
FIG. 3 is a cross-sectional view schematically showing a structure of a face panel in which a lens array layer is held by the face panel in the display device shown in FIG. 1.

Next, the face panel 30 holding the lens array layer 60 is explained. FIG. 3 is a cross-sectional view schematically showing the structure of the face panel 30 in which the lens array layer 60 is formed.

The face panel 30 is a glass substrate with uniform thickness. The lens array layer 60 is constituted by a plurality of cylindrical lenses arranged in a line in the second direction X. In the face panel 30, each cylindrical lens has a cylinder side projected to the under side of the face panel 30 so as to face the display panel 10. The form of a generating line of each cylinder side extends in the second direction Y. The lens array layer 60 is, for example, formed of transmissive resin material.

Figure 4:
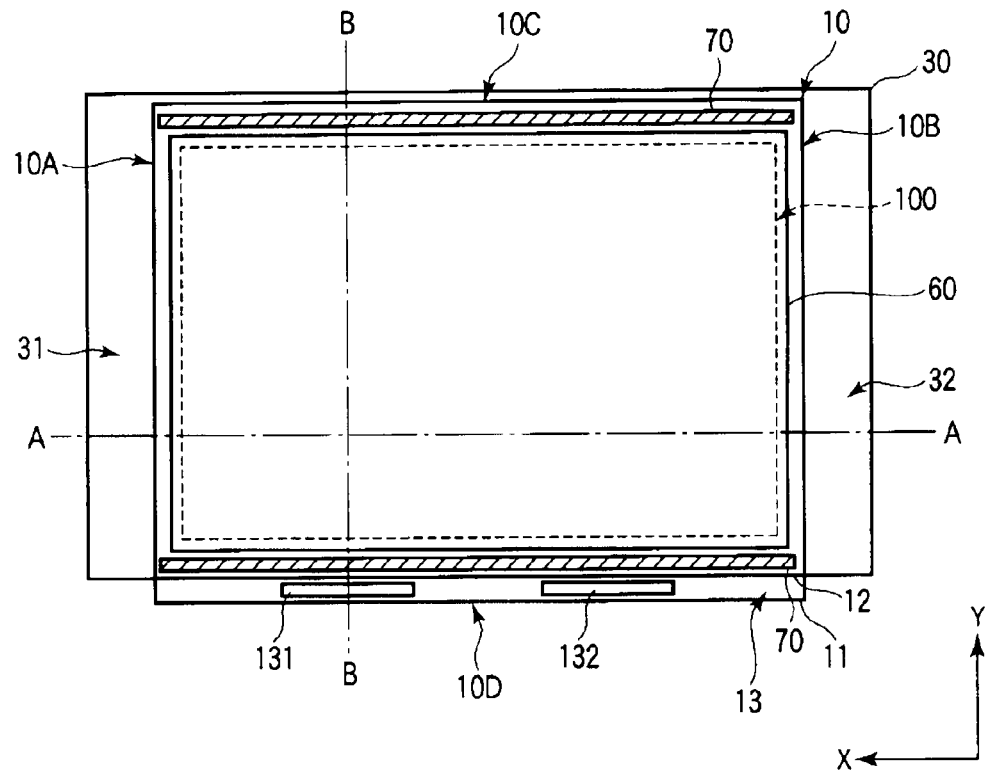
FIG. 4 is a plan view schematically showing a structure of the display panel attached to the face panel by adhesives.

Next, the display panel 10 and the face panel 30 attached by the adhesives 70 are explained. FIG. 4 is a plan view schematically showing the structure of the display panel 10 and the face panel 30 attached by the adhesives 70.

In the face panel 30, a portion extending from the first end portion 10 A to the outside of the display panel 10 corresponds to the first extending portion 31. Similarly, a portion extending from the second end portion 10B to the outside of the display panel 10 corresponds to the second extending portion 32. The lens array layer 60 is formed in an equal or larger size than the active area 100 in the display panel 10, and located right above the active area 100.

The adhesives 70 are arranged in a position with which the adhesives 70 do not overlap the active area 100 or the lens array layer 60, and formed in a shape of a straight line along the first direction X. That is, the adhesives 70 are located, respectively between the active area 100 or the lens array layer 60 and the third end 10C, and between the active area 100 or the lens array layer 60 and the fourth end 10D of the display panel 10.

In the display panel 10, the length in the second direction Y of the first substrate 11 is longer than that in the second direction Y of the second substrate 12, and a portion extending more to the outside than the second substrate 12 corresponds to a mounting portion 13. Moreover, the length in the second direction Y of the first substrate 11 is longer than that in the second direction Y of the face panel 30. The mounting portion 13 of the first substrate 11 is exposed from the face panel 30. That is, the terminal portions 131 and 132 of the mounting portion 13 are not overlapped with the face panel 30.

Figure 5:
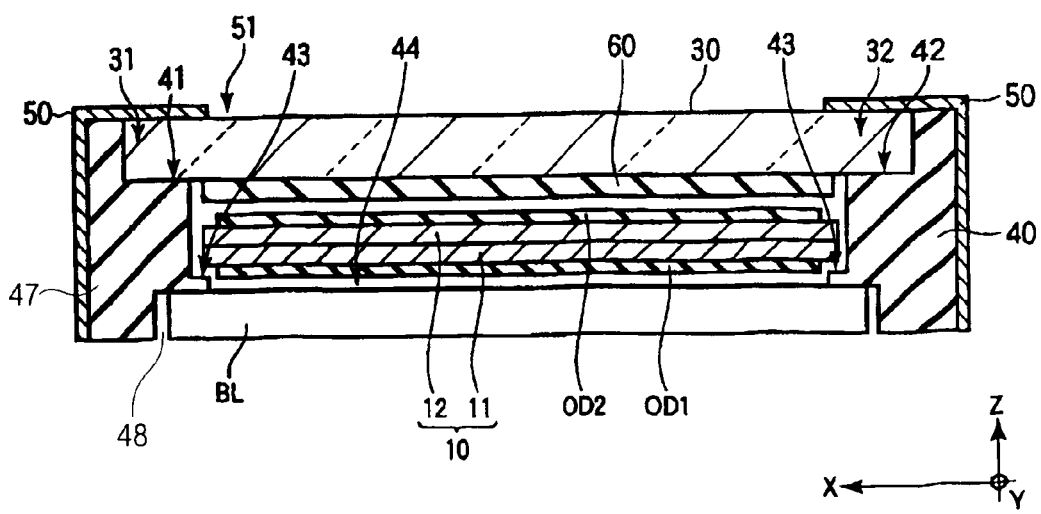
FIG. 5 is a cross-sectional view schematically showing the display device shown in FIG. 4 taken along line A-A in which the display panel and the face panel are implemented in a frame.

FIG. 5 is a cross-sectional view schematically showing a structure of the liquid crystal display device 1 which accommodates the display panel 10 and the face panel 30 in the frame 40 by taking along line A-A in FIG. 4.

The first extending portion 31 of the face panel 30 is supported by the first supporting portion 41 of the frame 40. The first extending portion 31 is sandwiched between the first supporting portion 41 and the bezel 50 fixed to the frame 40. Similarly, the second extending portion 32 of the face panel 30 is supported by the second supporting portion 42 of the frame 40. Similarly, the second extending portion 32 is sandwiched between the bezel 50 fixed to the frame 40 and the second supporting portion 42.

The lens array layer 60 formed on the surface of the face panel 30 and the display panel 10 fixed to the face panel 30 are located inside in the space formed by the frame 40 without contacting with the first supporting potion 41 and the second supporting portion 42. The display panel 10 is apart from the frame 40, and gap is formed between the first substrate 11 and the bottom portion 43 of the frame 40.

The first optical element OD1 arranged at the external surface of the first substrate 11 faces the opening 44 formed in the frame 40. Moreover, the second optical element OD2 arranged at the external surface of the second substrate 12 faces the lens array layer 60 apart from the lens array layer 60. The opening 51 of the bezel 50 is located right above the lens array layer 60.

The frame 40 includes a back light container portion 48 formed at the bottom side of the frame 40 to accommodate a back light BL in the back side of the display panel 10 so as to face first optical element OD1. The back light BL illuminates the active area 100 of the display panel 10 from the opening 44. Various types of the back light BL can be applied. For example, a backlight using either one of light emitting diodes or cold-cathode tubes can be used as a light source though the explanation about the detailed structure is skipped.

Figure 6:
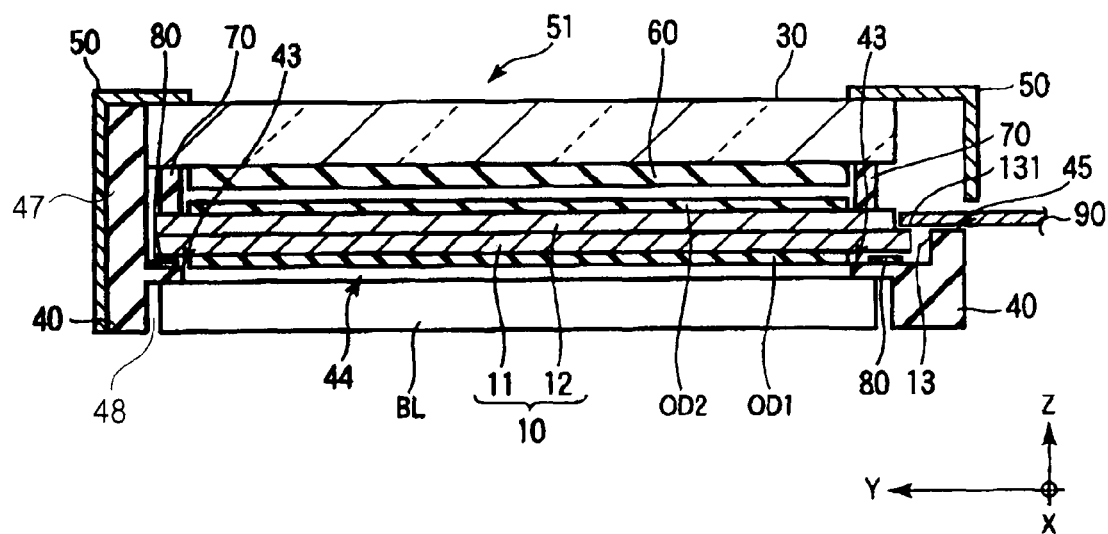
FIG. 6 is a cross-sectional view schematically showing the display device shown in FIG. 4 taken along line B-B in which the display panel and the face panel are implemented in the frame.

FIG. 6 is a cross-sectional view schematically showing the liquid crystal display device shown in FIG. 4 taken along line B-B in which the display panel and the face panel are implemented in the frame.

The adhesives 70 on which the display panel 10 and the face panel 30 are attached are arranged on the display panel 10 along the third and fourth ends interposing the second optical element OD2 and the lens array layer 60 therebetween. That is, the adhesives 70 attach the second substrate 12 to the face panel 30 of the display panel 10.

The display panel 10 is spaced apart from the bottom portion 43 of the frame 40. Moreover, the first substrate 11 of the display panel 10 is also spaced apart from the pair of elastic elements 80 arranged on the bottom portion 43 of the frame 40. The pair of elastic elements 80 are respectively arranged on the both sides of the bottom portion 43 adjacent to the opening 44 formed in the frame 40 and extending along the X direction. One of the elastic elements 80 is located directly under the mounting portion 13 of the first substrate 11.

The flexible wiring board 90 is connected to the terminal portions 131 and 132 of the mounting portion 13. The flexible wiring board 90 is drawn to outside the frame 40 from the notched portions 45 and 46 formed in a frame side portion 47 of the frame 40. The notched portions 45 and 46 are formed so that respective lower ends of the notched portions 45 and 46 are adjacent to the terminal portions 131 and 132 of the mounting portion 13. The bezel 50 of a frame-like shape presses down the face panel 30 from upper side and is fixed to side frame portions 47 of the frame 40. The bezel 50 supports the extending portions 31 and 32 of the face panel 30 on the first and second supporting portions 41 and 42 of the frame 40.

While demand for a flat display panel 10 has increased, mechanical strength of such a display panel 10 has not increased. According to this embodiment, even if the display panel 10 is weaker than the face panel 30, and stress is applied to the display panel 10 from outside, breakage of the display panel 10 originated from a contact point with the frame 40 is suppressed because the display panel 10 fixed to the face panel 30 is arranged apart from the frame 40 without contacting each other.

While the face panel 30 holding the display panel 10 is supported by the first supporting portion 41 and the second supporting portion 42 of the frame 40 which face the first extending portion 31 and the second extending portion 32 of the face panel 30, respectively, other portions of the face panel 30 are not supported by the frame 40. That is, when external stress which pushes the face panel 30 is applied, the display panel 10 bends so that the display panel 10 curves along the third end 10C and the fourth end 10D of the display panel 10. However, the elastic element 80 is arranged in the bottom portion 43 of the frame 40 which faces the third end 10C and the fourth end 10D of the display panel 10.

Accordingly, when the display panel 10 curves extremely, the display panel 10 contacts with the elastic elements 80, and generating of the curve which results in the damage of the display panel 10 is suppressed. Moreover, the direct contact of the display panel 10 with the frame 40 is avoided. Therefore, even if comparatively strong external stress is applied, it becomes possible to suppress the breakage of the display panel 10.

Moreover, the mounting portion 13 of the display panel 10 is exposed from the face panel 30. Accordingly, when repair of the signal source mounted in the mounting portion 13 of the display panel 10 is needed after the display panel 10 has been attached to the face panel 30, the face panel 30 does not become obstructive. Therefore, it becomes possible to repair the signal source promptly and easily.

Furthermore, the adhesives 70 on which the display panel 10 and the face panel 30 are fixed are arranged along the third end 10C and the fourth end 10D of the display panel 10 which are not supported by the frame 40. Accordingly, even if the display panel 10 and the face panel 30 curve, it becomes possible to hold the suitable gap for enabling the 3D display between the display panel 10 and the face panel 30 because the display panel 10 and the face panel 30 curve together.

In this embodiment, although the case where a liquid crystal display panel is applied is explained as the display panel 10, not only this example but an organic electroluminescence display panel and a plasma display panel etc. can be applied.

According to this embodiment, although a transmissive type liquid crystal display is used as the display panel 10 in which the back light BL is needed, it is also possible to apply a reflective liquid crystal display panel as the display panel 10.

In this embodiment, although the example in which the lens array layer 60 is arranged on the surface of the face panel 30 opposing to the display panel 10 is explained, a touch panel may be arranged on the surface of the face panel 30. According to the embodiment in which the touch panel is arranged between the display panel 10 and the face panel 30, a force to press the face panel 30 is exerted. Since the display panel 10 is spaced apart from the frame 40, it becomes possible to suppress the breakage of the display panel 10 by such force. In addition, when applying the touch panel instead of the lens array layer, the face panel 30 may serve as the substrate which constitutes the touch panel. The touch panel is formed of a pair of glass substrates and a pressure sensor interposed therebetween.

While certain embodiments have been described, these embodiments have been presented by way of example only, and are not intended to limit the scope of the inventions. In practice, the structural elements can be modified without departing from the spirit of the invention. Various embodiments can be made by properly combining the structural elements disclosed in the embodiments. For example, some structural elements may be omitted from all the structural elements disclosed in the embodiments. Furthermore, structural elements in different embodiments may properly be combined. The accompanying claims and their equivalents are intended to cover such forms or modifications as would fall with the scope and spirit of the inventions.

What is claimed is:

1. A display device comprising:
   a display panel in a plate-like shape having a first end portion and a second end portion facing each other;
   a face panel arranged above the front side of the display panel including a first extending portion and a second extending portion extending to the outside beyond the first end portion and the second end portion of the display panel, respectively;
   an adhesive element to adhere the display panel to the face panel;
   a frame having a first supporting portion and a second supporting portion to support the first extending portion and the second extending portion of the face panel, respectively; and
   a bezel fixed to the face panel and the frame so that the first and second extending portions of the face panel are sandwiched between the bezel and the frame, respectively; wherein
   the display panel further includes a first surface facing the face panel and a second surface opposite to the first surface respectively spaced apart from the frame so that the second surface does not directly or indirectly contact the frame.

2. The display device according to claim 1, wherein the display panel includes a third end portion and a fourth end portion to connect the first end portion and the second end portion, and elastic elements are respectively arranged on a portion of the frame opposing to the third and fourth end portions of the display panel.

3. The display device according to claim 2, wherein the display panel includes a mounting portion arranged so as to be exposed from the face panel along the fourth end portion for mounting a signal source and pulling out a flexible wiring board.

4. The display device according to claim 2, wherein the adhesive elements are arranged along the third and fourth end portions of the display panel.

5. The display device according to claim 1, further comprising a lens array layer arranged on a surface of the face panel opposing to the display panel.

6. The display device according to claim 1, further comprising a touch panel arranged on a surface of the face panel opposing to the display panel.

* * * * *